United States Patent [19]

Patterson

[11] 4,395,297

[45] Jul. 26, 1983

[54] BONDING PROCESS FOR SECURING OBJECTS TO A SMOOTH SURFACE

[76] Inventor: Howard F. Patterson, 1840½ W. High St., Springfield, Ohio 45504

[21] Appl. No.: 411,262

[22] Filed: Aug. 25, 1982

[51] Int. Cl.³ .............................. G01B 5/00; C09J 5/02
[52] U.S. Cl. ........................................ 156/64; 40/594; 40/595; 52/746; 156/71; 156/295; 156/309.3; 156/309.6; 156/309.9; 156/313; 156/321; 156/322; 156/324.4; 248/467; 248/205 A
[58] Field of Search ..................... 52/309.3, 746; 248/205.3, 467; 156/64, 324.4, 295, 321, 311, 322, 71, 309.3, 313, 315, 309.6, 309.9; 40/594, 595

[56] References Cited

U.S. PATENT DOCUMENTS

| | | | |
|---|---|---|---|
| 1,990,098 | 2/1935 | Seymour | 156/309.3 |
| 2,544,169 | 3/1951 | Manning et al. | 156/321 |
| 2,874,500 | 2/1959 | Patterson | 156/321 |
| 3,117,045 | 1/1964 | Schwickert | 156/322 |
| 3,719,792 | 3/1973 | Cuccaro | 156/71 |

*Primary Examiner*—John J. Gallagher
*Attorney, Agent, or Firm*—Gregory A. Stobbs

[57] ABSTRACT

An object is secured to a flat surface by contacting a thermally activated sheet with a solvent rendering the normally non-tacky sheet in a tacky state. The now tacky sheet is attached to the flat surface with the aid of a template while the object to be secured is heated apart from the surface or the adhesive sheet. The heated object is then pressed against the adhesive sheet with the aid of the template and pressure is applied until the adhesive cools sufficiently to set forming a bond between the object and the flat surface.

10 Claims, 8 Drawing Figures

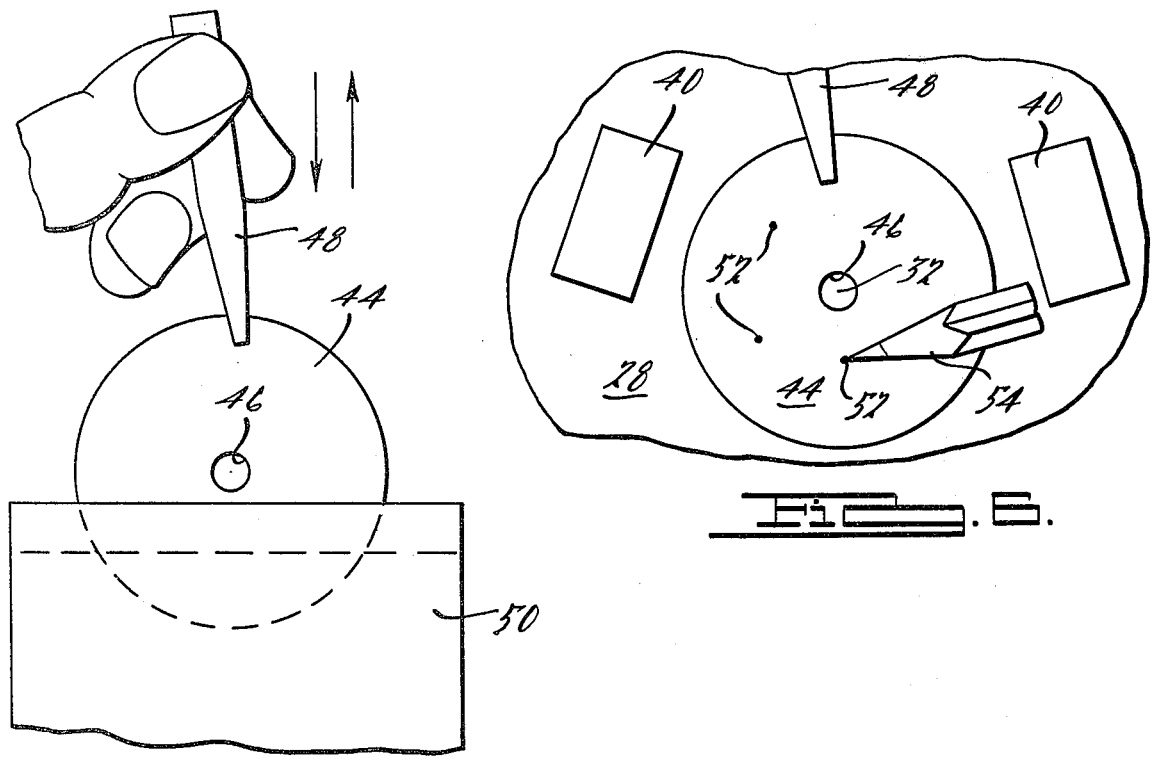
FIG. 5.
FIG. 6.
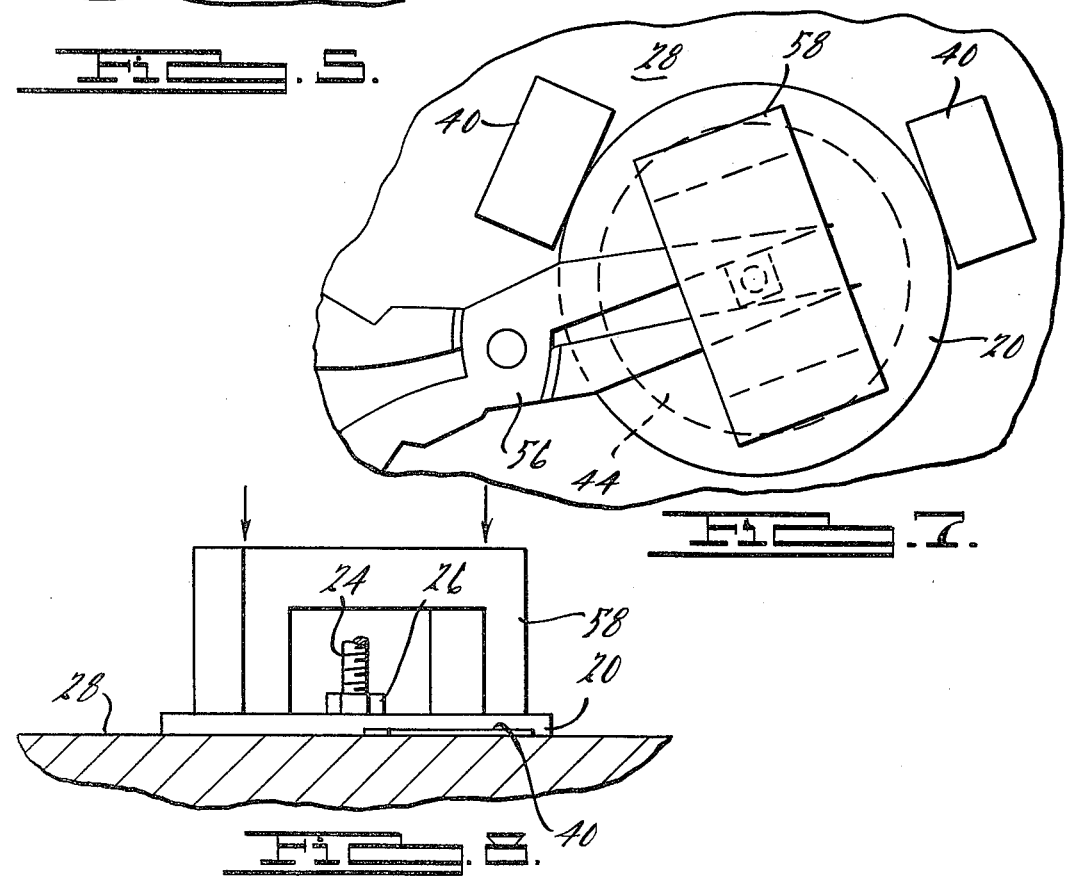
FIG. 7.
FIG. 8.

BONDING PROCESS FOR SECURING OBJECTS TO A SMOOTH SURFACE

FIELD OF THE INVENTION

This invention relates generally to methods for bonding objects to smooth surfaces, and in particular to a method of bonding employing a thermally responsive adhesive sheet or substrate which is normally non tacky at ambient atmospheric temperature but which is rendered tacky immediately prior to use by contacting with a solvent.

DESCRIPTION OF THE PRIOR ART

The increased popularity in recent years of drywall construction in homes has created a demand for suitable wall fixtures for hanging pictures, draperies, mirrors and the like. Ordinary picture hooks, secured by a nail, are frequently unsatisfactory for use with ordinary wall board, for the reason that objects can be hung upon the wall only when there is a stud properly located behind the wall board to receive the nail. Efforts to employ adhesives in hanging pictures and the like have been only partially successful, for the reason that insufficient structural strengths are obtained. Furthermore, many adhesives tend to drip or run when applied.

In my prior U.S. Pat. No. 2,874,500 entitled "Load Bearing Plate and Method for Securing the Plate and Other Ojbects to a Smooth Surface" I disclosed a method employing thermally responsive adhesives which greatly improved upon other known methods for securing objects to smooth surfaces such as the surface of a wall. In my prior method a sheet of thermally responsive adhesive, which was normally non-tacky at room temperature, was affixed to a wall by temporary means such as with masking tape and a heated object was then pressed against the adhesive sheet. Pressure was maintained against the heated object until the thermal responsive material cooled permitting the adhesive to set, thus firmly bonding the object to the surface. According to my prior method pressure had to be applied for approximately 90 seconds to 5 minutes before the adhesive was properly set. After the object was secured in place the unused portion of adhesive sheet was cut away from the wall surface. While this method proved to be an efficient and economical way of attaching objects to a smooth surface, the time required for the adhesive to set in some applications proved lengthy and a certain amount of the unused adhesive sheet was wasted. Part of the adhesive sheet wasted was the portion attached by masking tape or other external means to the wall surface.

It is an object of this invention to provide a method for securing an object to a smooth surface wherein a heat activated adhesive is transported or stored in a non-tacky state and rendered tacky immediately prior to use to facilitate attaching it to the surface. Another object is to provide a pre-cut adhesive sheet which may be readily positioned or located at precisely the point where the object is sought to be attached. In doing so, it is a further object to provide a thermally responsive adhesive sheet which provides the exact amount of adhesive material required without dripping, running or waste. It is another object to improve upon my method as taught in U.S. Pat. No. 2,874,500 by significantly reducing the adhesive setting time, to thereby permit the artisan or handiman to secure desired objects to a surface at a much faster rate. These and other objects and advantages of the invention will become more apparent from the following description and with reference to the accompanying drawings.

BRIEF DESCRIPTION OF THE DRAWINGS

FIG. 5 is a side elevational view illustrating an adhesive substrate being dipped in a solvent;

FIG. 6 illustrates the adhesive substrate being tacked into position on the wall; and FIGS. 7 and 8 illustrate an anchor coin being pressed against the adhesive substrate according to the invention.

DESCRIPTION OF THE PREFERRED EMBODIMENT

Figure 1:
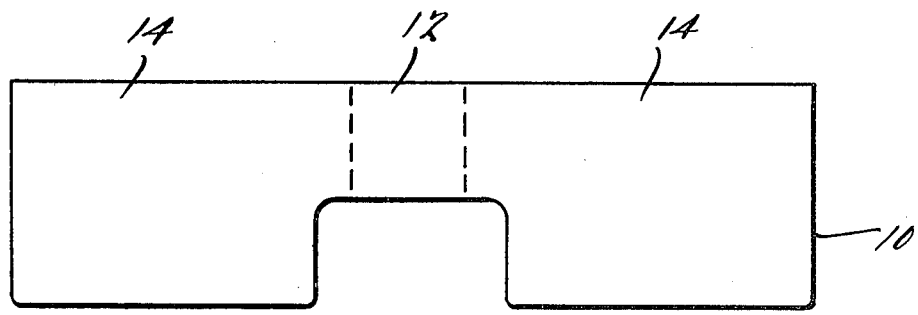
FIG. 1 is a top plan view of a dip tank useful in practicing the invention.
Figure 2:
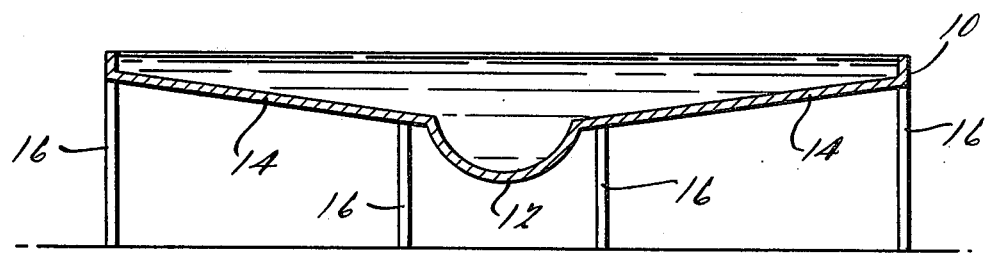
FIG. 2 is a side elevational view of the dip tank of FIG. 1.

The present invention provides a procedure whereby an object may be secured to a smooth surface, such as the surface of a wall for example, by means of a thermally responsive adhesive sheet or substrate. It is anticipated that the invention would normally be practiced by preparing the adhesive sheet in mass produced quantities for packaging and storage prior to use. Preparation of the adhesive sheet will thus first be described. With reference to FIGS. 1 and 2, a dipping tank denoted generally by reference numeral 10 is illustrated. The dipping tank has a semi cylindrical well or reservoir 12 depending from tapered bottom portions 14 and supported by legs 16. Preferably two of such dipping tanks are used in the manufacture of the adhesive substrate. It will be appreciated that use of the dipping tank 10 is presently preferred, however, the particular construction of the dipping tank is not intended to limit the scope of the invention. Other suitable tanks may be substituted therefore. A first dipping tank is filled with a mixture comprising preferably three pound cut shellac which is 30.7% pure shellac and 69.3% S.D. alcohol. White shellac is presently preferred. A second dipping tank is filled with a liquid comprising the product known by the trade identification A-851-B and otherwise identified as a nitrile rubber based adhesive in a solvent bath and produced by B. F. Goodrich and packaged by W. J. Ruscoe Company of Akron, Ohio. The A-851-B is mixed in equal parts with a thinning liquid such as methyl ethyl ketone. Simultaneously controlled amounts of methyl ethyl ketone and A-851-B are added under constant agitation so as to maintain a constant viscosity.

A carrier of woven synthetic cloth material having a thickness of approximately 0.0065 inches and having a plurality of generally square pores or openings in the weave, each measuring 0.035 to 0.040 inches across, is used to carry the adhesive materials. It is to be understood that the dimensions given are by way of example and that the invention is by no means restricted to these dimensions. The carrier is first dipped in the tank containing shellac by passing it through the tank first one face down and then the other so as to charge the pores with shellac. The carrier is then allowed to dry for approximately two hours, whereupon it is again dipped into the shellac, and again allowed to dry for approximately two hours. Next the carrier, twice coated with shellac, is dipped in the second tank containing equal parts of A-851-B and methyl ethyl ketone. The carrier is dipped with a first face down and then allowed to dry to the touch, whereupon it is again dipped with the second face down. The finished sheets are now allowed to hang dry for about six hours. The sheets may then be trimmed to the desired size and shape and stored by interleaving between sheets of silicone treated paper.

While the adhesive sheets may consist of layers or laminates of shellac and nitrile rubber based adhesive, those skilled in the art will appreciate other equivalent substances may be used.

Figure 3:
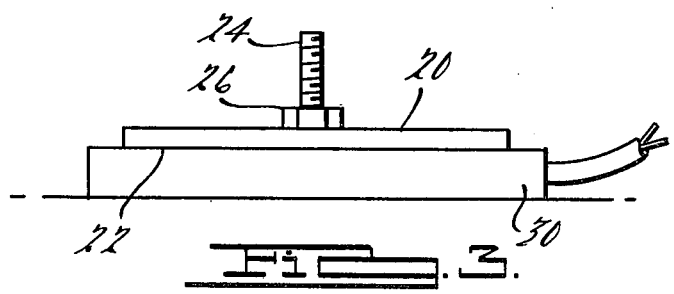
FIG. 3 is a perspective view of a heating plate used in practicing the invention showing an anchor coin being heated.

For purposes of illustrating the present invention a circular disk or anchor coin 20 will be taken as the object to be secured to a smooth surface such as the surface of a wall. FIGS. 3 and 7 illustrate a suitable coin 20 comprising a circular disk having at least one flat face or surface 22, and preferably having a threaded stud 24 to which a nut 26 may be attached. The threaded stud 24 and nut 26 provide a convenient means whereby other hardware may be attached, such as shelf bracket hardware, for example. However, it will be understood that the shape of the object to be secured to a surface need not be a circular disk. So long as the object has a flat surface, any shape may be employed. Furthermore, the threaded stud is not essential, as the coin might be fashioned with an outstanding flange portion to which external hardware can be attached. The invention thus finds utility in a number of applications, including securing a variety of objects to a wall, such as mirrors, pictures, supporting shelf brackets and curtain rods, and the fastening together of temporary or permanent structural members, as might be used in the construction of window displays or advertising booths, to name but a few examples.

Figure 4:
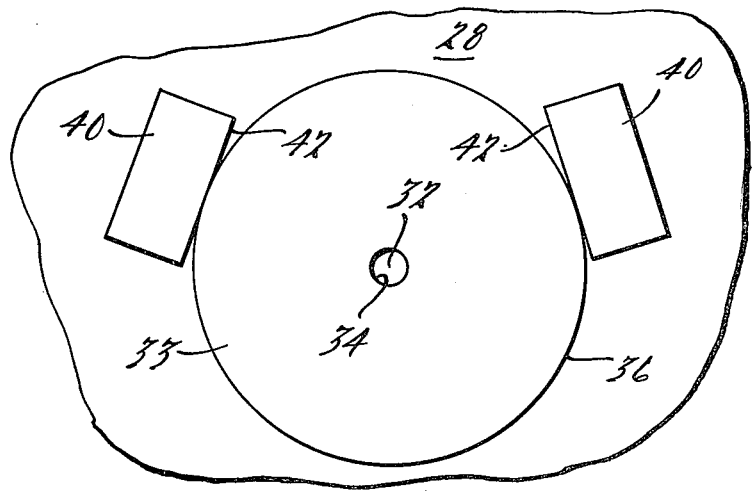
FIG. 4 is an elevational view of a portion of a wall illustrating the placement of and use of a template used in practicing the invention.

Referring to FIGS. 3 through 7, the method of securing an object, in this case a coin 20, to a flat structural surface 28 is illustrated. The structural surface 28 may be unfinished, painted or papered drywall, wood or printed paneling, granite, marble, ceramic tile, glass, or any other suitable construction material. The coin 20 may be made of metal or any other material capable of being heated to approximately 300 degrees farenheight. With reference to FIG. 3, a hot plate 30 is heated to approximately 300 degrees farenheight and the coin 20 is placed on hot plate 30 with its flat surface 22 in intimate thermal contact therewith. Meanwhile the structural surface is prepared, as shown in FIG. 4, by locating a point on the surface over which the coin 20 is to be centered. If the surface has no convenient, identifiable markings, this point may be marked as with a dot 32. Next a circular template 33, shown in FIG. 4, having a circular opening or window 34 in the center thereof and having an outer circumference 36 generally congruent with the outer circumference of coin 20, is placed so the dot 32 is centered within or registers with the opening 34 of the template. While holding template 33 in position the window 34 is traced with a pencil, pen, or scribe to leave a visual indication or center mark 35 on surface 28 where the center of the adhesive substrate is to be placed. At the same time two or more short lengths of masking tape 40 are attached to surface 28 so that each tape section is tangent at one edge 42 thereof to the outer circumference of template 36. The masking tape sections provide an easily removable visual indication where the coin 20 is to be located, as will be further explained. Having marked the center location as by scribing or tracing opening 34 and having marked the outer circumference as with masking tape, the template may now be removed.

Referring to FIG. 5 the adhesive sheet or substrate 44 is illustrated. Substrate 44 is precut or fashioned into a generally circular shape conforming to the shape of coin 20, although slightly smaller in diameter. The adhesive substrate 44 also includes an opening or hole 46 in the center thereof generally the same size and shape as opening 34 in template 33. The adhesive substrate 44 is gripped as with forceps or tweezers 48 and dipped into a reservoir of solvent such as methyl ethyl ketone 50. Prior to the dipping operation the adhesion substrate is in a relatively non-tacky state at ambient atmospheric temperatures. By dipping or contacting with solvent 50 the adhesive substrate 44 is rendered relatively tacky.

With reference to FIG. 6, the adhesive substrate 44, now in a tacky state, is placed on the surface 28 so that the hole 46 registers with the center mark 35 scribed on surface 28 with the template 33. The now tacky adhesive substrate is tacked to or affixed to the surface by tapping at several locations 52 with a blunt object 54.

The coin 20, by this time having attained a temperature at its surface 22 of approximately 300 degrees farenheight, is grasped as with pliers 56 and pressed against the adhesive substrate. Tape sections 40 are used to locate the coin 20 as shown in FIG. 7.

The heat energy stored in coin 20 activates the thermally responsive adhesive substrate. By pressing the coin against the flat surface 28, as with a bucking tool 58, the adhesive is caused to flow into intimate contact with the surface of the coin 20 and the coin surface of the wall 28. The shellac immediately sizes the back of the heated coin as well as the opposing surface 28 and a quantity thereof becomes displaced to points beyond the outer periphery of the adhesive layer. This displacement allows the A-851-B to fill the void created by the displaced shellac. For the first few seconds the coin may be slidably positioned into exact registration between the tape sections 40. Pressure is maintained on the bucking tool which in turn exerts pressure at opposite sides of threaded stud 26. After approximately 20 seconds the plyers 56 may be removed and after an additional 25 seconds the bucking tool may be removed. Upon cooling the displaced shellac forms a seal about the outer periphery of the adhesive layer. Outside elements are thereby prevented from altering the bonding strength of the A-851-B. The coin is now securely attached to the surface 28. Usually an additional seven to ten minutes is required for the coin and the background surface to cool to the touch, at which time the assembly is ready for service.

Although the preferred embodiment of the invention has been described, it will be understood that variations in the method may be indulged in without departing from the sphere of the invention or the scope of the appended claims.

What is claimed is:

1. The method of securing an object to a smooth surface comprising the steps of contacting a thermally activated adhesive substrate with a solvent rendering said adhesive substrate tacky, said adhesive substrate, until so contacted, being in a non tacky state at ambient atmospheric temperature, affixing said tacky adhesive substrate to said surface,
supplying heat to said object apart from said surface and said adhesive substrate thereon,
pressing a surface of said heated object against said adhesive substrate, and
allowing the object of cool under pressure so as to make contact with the adhesive substrate.

2. The method according to claim 1 further comprising the step of fashioning said adhesive substrate into a shape conforming to the shape of said surface of said heated object.

3. The method according to claim 1 further comprising providing said adhesive substrate with an opening, locating a point on said smooth surface, and registering said point within said opening.

4. The method according to claim 3 wherein said opening is provided at the center of said adhesive substrate.

5. The method according to claim 3 further comprising placing a suitably cut template having an opening therein on said smooth surface so the opening of said template is in registration with said point on said smooth surface, and using said template as a guide for positioning said object.

6. The method according to claim 1 wherein said object is allowed to cool under pressure until said adhesive sets forming a bond between said object and said smooth surface.

7. The method of claim 1 comprising the additional step of removing said pressure from said object before said object has cooled to ambient atmospheric temperature.

8. The method according to claim 1 wherein said adhesive substrate comprises a laminate of shellac and nitrile rubber based adhesive.

9. The method according to claim 8 wherein the step of pressing a surface of said heated object against said adhesive substrate melts said shellac and thereby sizes the surface of said heated object and said smooth surface.

10. The method according to claim 8 wherein the step of pressing a surface of said heated object against said adhesive substrate displaces a quantity of said shellac to the outer periphery of said adhesive substrate forming a seal.

* * * * *